US012165018B2

(12) United States Patent
Geigel

(10) Patent No.: US 12,165,018 B2
(45) Date of Patent: Dec. 10, 2024

(54) SYSTEM AND METHOD OF CONSTRUCTING MACHINE LEARNING WORKFLOWS THROUGH MACHINE LEARNING SUGGESTIONS

(71) Applicant: Atlantic Technical Organization, San Juan, PR (US)

(72) Inventor: Arturo Geigel, San Juan, PR (US)

(*) Notice: Subject to any disclaimer, the term of this patent is extended or adjusted under 35 U.S.C. 154(b) by 840 days.

(21) Appl. No.: 17/115,973

(22) Filed: Dec. 9, 2020

(65) Prior Publication Data
US 2022/0180245 A1    Jun. 9, 2022

(51) Int. Cl.
*G06N 20/00*    (2019.01)
*G06N 7/01*    (2023.01)

(52) U.S. Cl.
CPC .............. *G06N 20/00* (2019.01); *G06N 7/01* (2023.01)

(58) Field of Classification Search
CPC ........ G06N 20/00; G06N 20/10; G06N 20/20; G06N 7/00; G06N 7/01; G06N 7/04; G06N 7/05
See application file for complete search history.

(56) References Cited

U.S. PATENT DOCUMENTS

| | | | | |
|---|---|---|---|---|
| 11,620,574 B2* | 4/2023 | Parameswaran | ...... | G06F 9/3838 706/12 |
| 2018/0165604 A1* | 6/2018 | Minkin | ........... | G06Q 10/06 |
| 2021/0264202 A1* | 8/2021 | Kalluri | ........... | G06F 18/23 |

OTHER PUBLICATIONS

Sherrick "An Introduction to Graphical User Interfaces and Their Use by CITIS" 1992 https://nvlpubs.nist.gov/nistpubs/Legacy/IR/nistir4876.pdf (Year: 1992).*
Esteves, Sérgio, Helena Galhardas, and Luís Veiga. "Smart Scheduling of Continuous Data-Intensive Workflows with Machine Learning Triggered Execution." arXiv preprint arXiv:1612.03852 (2016): 1-21 (Year: 2016).*
Xin, Doris, et al. "Helix: Holistic optimization for accelerating iterative machine learning." arXiv preprint arXiv:1812.05762 (2018): 1-21 (Year: 2018).*
Makrynioti, Nantia, Ruy Ley-Wild, and Vasilis Vassalos. "sql4ml A declarative end-to-end workflow for machine learning." arXiv preprint arXiv:1907.12415 (2019): 1-14. (Year: 2019).*
Quemy, Alexandre. "Two-stage optimization for machine learning workflow." Information Systems 92 (Sep. 2020): 101483. (Year: 2020).*
Lee, Angela, et al. "Demystifying a dark art: Understanding real-world machine learning model development." arXiv preprint arXiv:2005.01520 (May 2020): 1-13 (Year: 2020).*

* cited by examiner

*Primary Examiner* — Randall K. Baldwin
(74) *Attorney, Agent, or Firm* — Luis Figarella

(57) ABSTRACT

A system and method of constructing a machine learning workflow by using machine learning suggestions derived from determining path lengths in a plurality of existing workflows, assigning a frequency threshold for each path and determining a probability for each path. This information is utilized to determine transpositions and deletions between paths that can be used as training for a machine learning algorithm that will suggest to the user which operators to put in a new machine learning workflow.

14 Claims, 19 Drawing Sheets

| Operator | Operator ID | Operation | Operation ID |
|---|---|---|---|
| 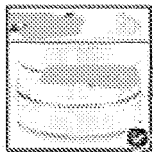 | 2 | Database connector | 1 |
| 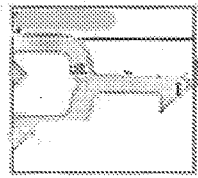 | 5 | Join Data Paths | 2 |
| 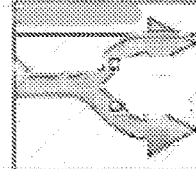 | 4 | Split Data Paths | 3 |
| 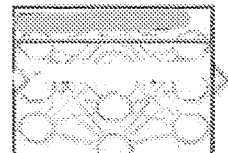 | 1 | Supervised Learning Operation | 4 |
| 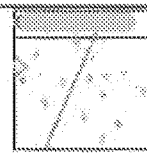 | 1 | Clustering Operation | 5 |
| 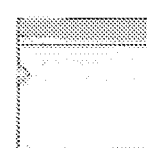 | 1 | Sort Rows Operation | 6 |
| 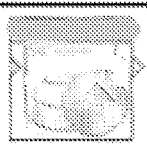 | 1 | Database connector to save Data | 7 |
FIG. 5

SYSTEM AND METHOD OF CONSTRUCTING MACHINE LEARNING WORKFLOWS THROUGH MACHINE LEARNING SUGGESTIONS

BACKGROUND OF THE INVENTION

Field of the Invention

The present disclosure is directed to a system and method for providing assistance to complete machine learning on workflow engines that deal with Extract-Transform-Load (ETL) and machine learning flows.

Discussion of the Background

Current trends in machine learning are advancing at a rapid pace. As they become mainstream, machine learning implementations will shift focus from single module implementations or two to three modules to a complex web where dozens of machine learning algorithms alongside ETL operations are carried out. The complexity of this web on which multiple machine learning algorithms and ETL processes interact will strain the cognitive limitations of their creators. Some of these issues are already is being documented in other similar scenarios such as the one in *Lost in transportation: Information measures and cognitive limits in multilayer navigation*, by Riccardo Gallotti, Mason A. Porter, and Marc Barthelemy.

The present disclosure is directed at identifying commonalities in multiple machine learning flows by clustering similar flows based on an inclusion/exclusion criterion through properly encoding criteria of the required elements of processing a machine learning workflow.

This process is the first step in a more complex process of getting a machine learning algorithm to learn machine learning flows. Clustering machine learning flows helps in isolating commonalities that machine learning algorithms can use for learning the necessary patterns to construct similar machine learning workflows.

DESCRIPTION AND SHORTCOMINGS OF THE PRIOR ART

While application platforms can offer some level of abstraction by providing graphical user interfaces, hiding the complexity of programming languages, there is still a cognitive overload possibility due to complex workflows that can be developed to manage complex data processing tasks.

U.S. Pat. No. 6,606,613 (the "'613 patent") B1 describes task models to help users complete tasks. This prior art has several shortcomings which are outlined as follows. First, the '613 patent models a single user's tasks whereas the present disclosure aims at parallel processes of tasks which present a different solving paradigm. Second, the clustering used in the '613 patent of similar tasks is based on agglomerative hierarchical clustering and this works for segregating tasks based on intersections and the difference between graphs.

The problem that the present disclosure aims to solve is how to cluster the machine learning workflows not on merely graph properties but also properties of the workflow itself. Properties such as the type of operation and its adjacent operators play a crucial role in establishing a processing pipeline that describes segments of the workflow. The properties that are crucial for proper segregation of the workflows require that each segment of the workflow be described by the operation being done, the algorithm used, the type of data being processed, and the underlying processing infrastructure in a parallel environment. Each of these properties can be further broken down according to processing speed, algorithm complexity, particular operation optimization, etc. These elements are essential in describing each node of processing in a parallel environment which are separate from the graph itself. Further, the graph itself is not a useful concept in parallel operation due to timing issue that might make a difference in processing. Such shortcomings are overcome in the present disclosure by embedding the graph in a coordinate system which can be fitted according to the requirements of comparison.

U.S. Pat. No. 8,954,850 (the "'850 patent") uses agglomerative clustering to assist the user in building a workflow. The objective of this prior art is to detect similar patterns of construction of a flow in terms of the nodes under each branch of the business process. The limitation of this approach is that objects classified within a branch are not treated as sequentially dependent. Such data is indispensable to describe time dependent and operation dependent flows.

Providing appropriate contextual information beyond the graph structure is essential to any accurate matching of workflows, which the prior art does not provide. Contextual information that is not present in the prior art that can be used as properties of the workflow are their appropriate position with regards to other elements, where they are going to be executed, whether multiple flows share the same sequential information and in what order and patterns of multiple operators in a sequence. Discriminating among sequences into different branches of the clusters is also not present in the prior art. All these shortcomings limit the prior art on the degree of accuracy of the automation that can be produced by such methods.

BRIEF DESCRIPTION OF THE DRAWINGS

FIG. 5 shows a database table of a particular implementation of operator types alongside identifying fields according to the teachings of the present invention.

DETAILED DESCRIPTION OF THE PREFERRED EMBODIMENTS

Figure 1:
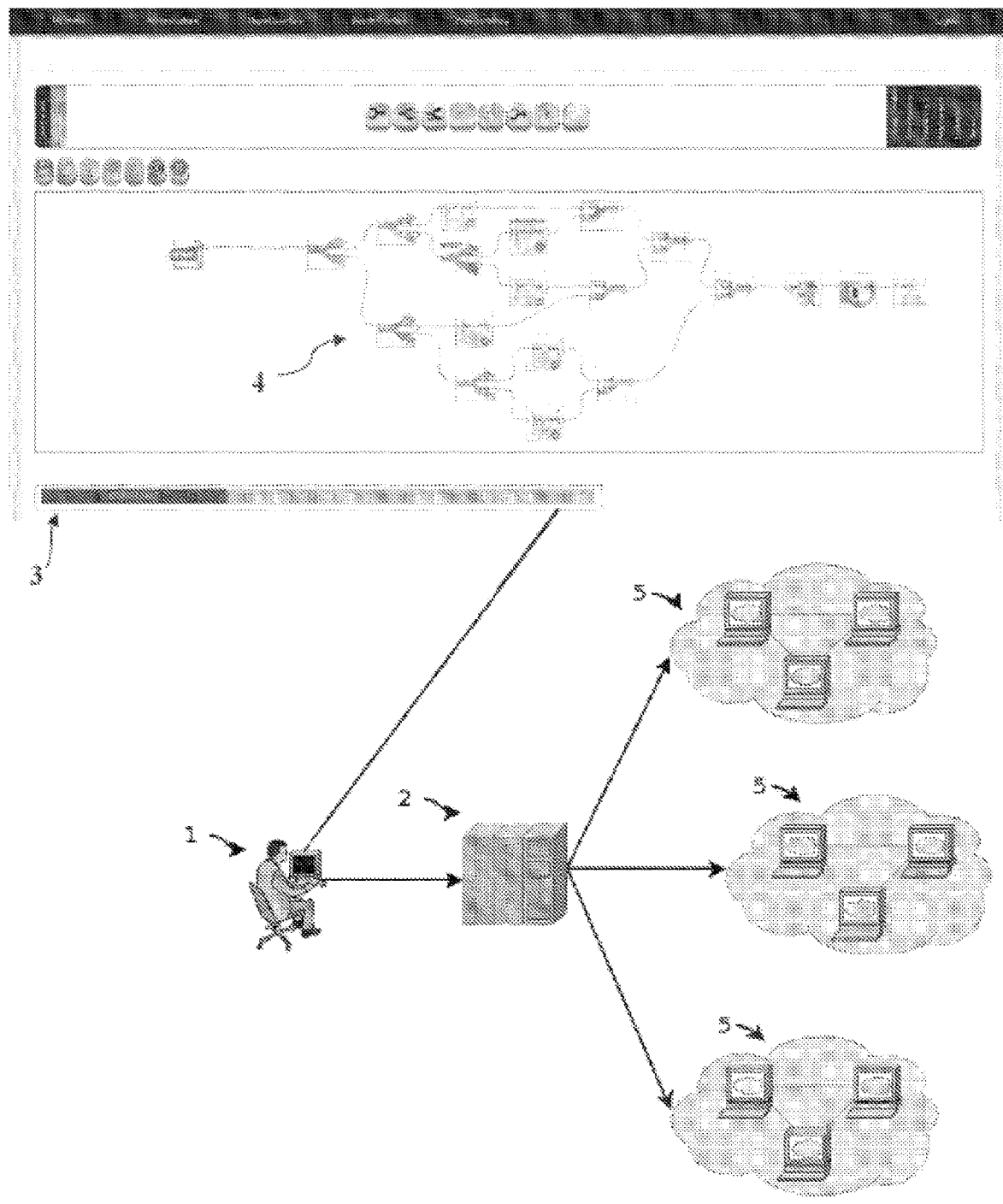
FIG. 1 shows a typical embodiment of a system that performs the functions of making machine learning workflows according to the teachings of the present invention.

FIG. 1 Shows a typical embodiment of a system that performs the functions of making machine learning workflows. The system is accessed by a user through a terminal 1. The terminal 1 is connected to a central processing system 2 that contains memory components and processing units. The terminal accesses the functionality of the of the central processing system via an interface system 3 that has functionality icon 4. The central processing system 2 will process the information given by the interface system 3 and a functionality icon 4 to the terminal systems CPU and memory system or to a distributed architecture 5.

Figure 2:
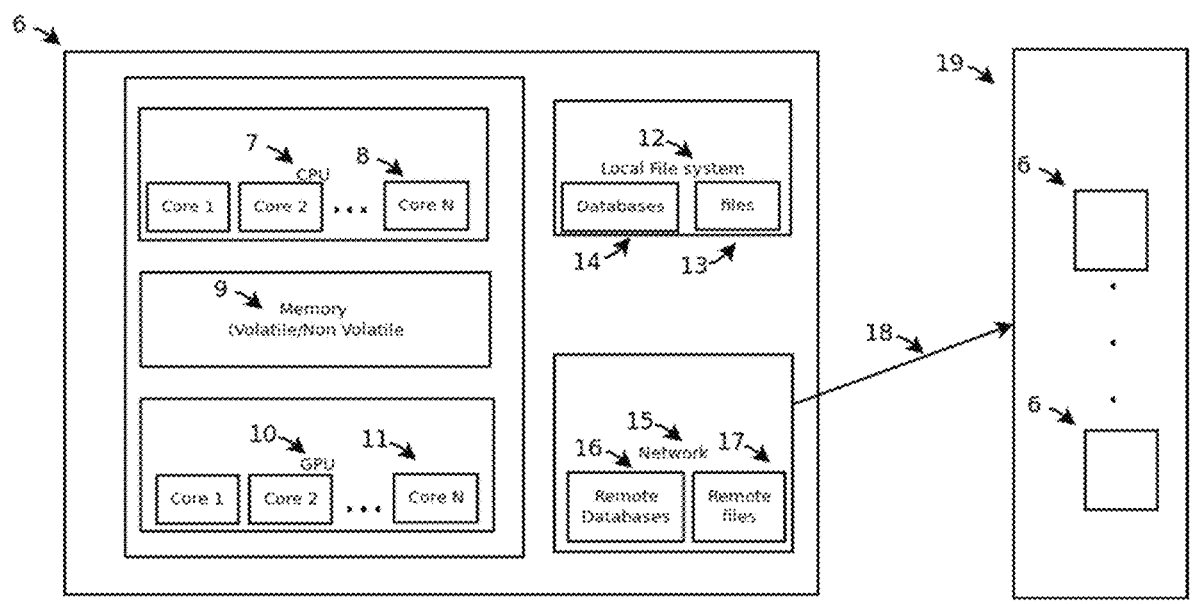
FIG. 2 describes the physical layout of the typical execution environment on which the parallel execution will take place according to the teachings of the present invention.

FIG. 2 describes an example of the physical layout of the typical execution environment on which the parallel execution takes place. A typical embodiment consists of a computer system 6 that contains a CPU 7 with a number of N cores 8. The N cores 8 are capable of doing multi-threading tasks on the CPU 7. The computer system 6 also contains a memory system capable of storing information for processing by the CPU 7. The computer system 6 can also contain a compute capable GPU 10 with a number of N cores 11. Computer system 6 has a local file system 12 that can contain several files 13 and possibly a database system 14. Computer system 6 includes a network interface 15 that can access a remote database system 16 or a remote file system 17. Access to remote database system 16 and/or a remote file system 17 is done through a network card in network 15 via a connection 18 to a cloud infrastructure 19. The cloud infrastructure 19 contains up to n computer systems 6.

Figure 3:
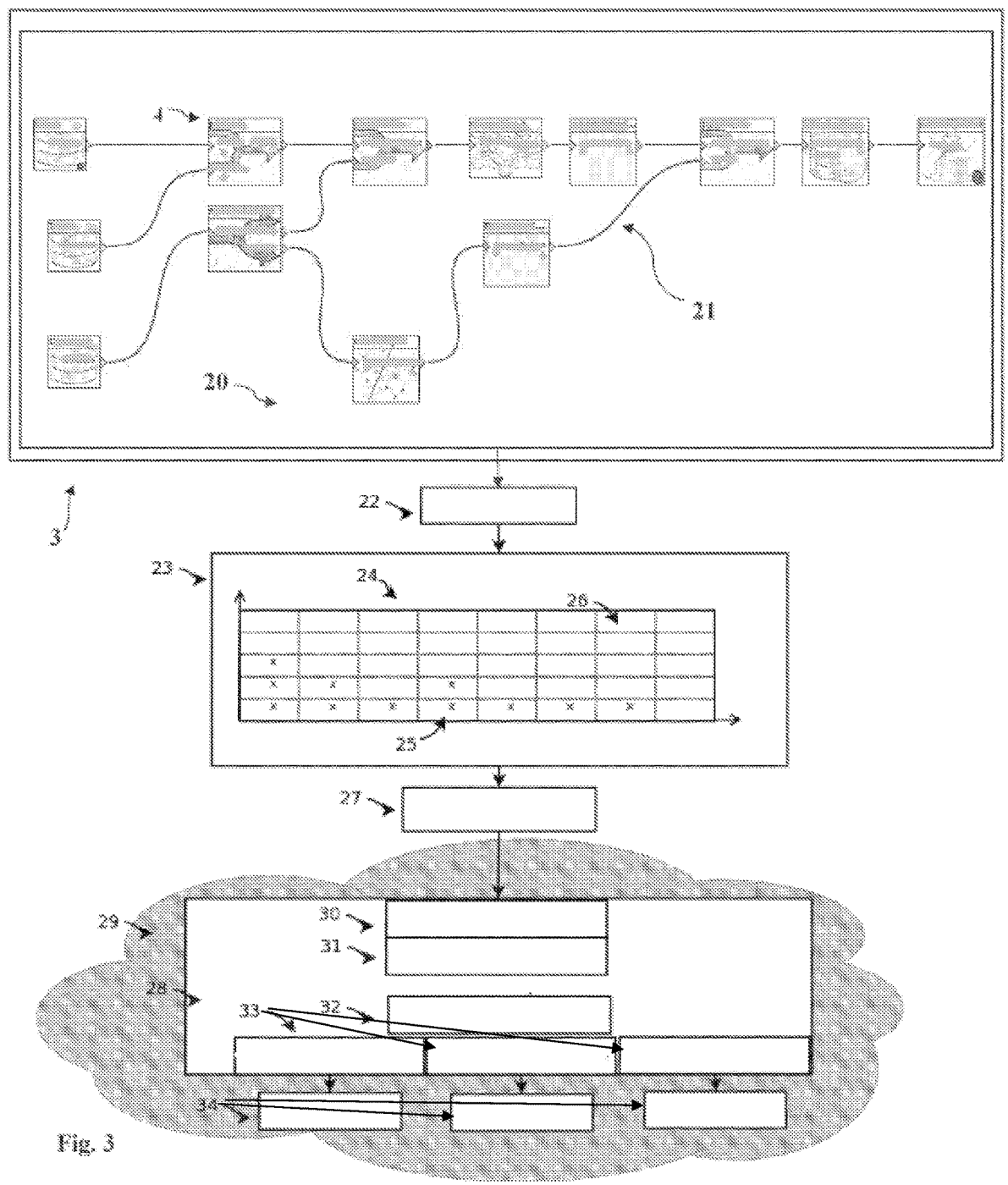
FIG. 3 displays a graphical representation of the major components of an exemplary system that can perform the functions of making machine learning workflows according to the teachings of the present invention.

FIG. 3 Displays a graphical representation of the major components of an exemplary system that can perform the functions for making machine learning workflows. The system starts with the interface system 3 that has functionality icon 4, which contains the configuration that the system will execute. An execution program 20 is specified by the functionality icon 4 connected via a link 21. Once the execution program 20 is finished the program will be forwarded to an execution manager 22. The execution manager 22 will reside on the central processing system 2 which is a typical computer system 6. The execution manager will produce an execution map 23 based on the execution program 20. The execution map 23 contains an execution matrix 24 that will store the order of the execution. Each entry in the execution matrix 24 is assigned an execution slot 25 that can be filled with an execution entry 26 that corresponds to functionality icon 4. Once the execution map 23 is completed it is passed to a controller 27 that also resides central processing system 2. The controller coordinates the execution with an execution engine 28 across the cloud environment 29. Cloud environment 29 is composed of cloud infrastructure 19 that contains up to n computer systems 6. The controller 27 communicates to an execution engine coordinator 30 that resides on one of n computer systems 6 of cloud environment 29. The execution engine coordinator 30 uses a hardware selector 31 to discriminate which component of computer systems 6 should be used. For example, hardware selector 31 can choose between execution between the N cores 8 on the CPU 7 or use GPU 10 or other processing technology. Once hardware selector 31 chooses the particular processing technology, the hardware selector 31 selects a hardware optimizer 32 which coordinates with a hardware software module 33 that contains the necessary routines to interact with hardware 34.

Figure 4:
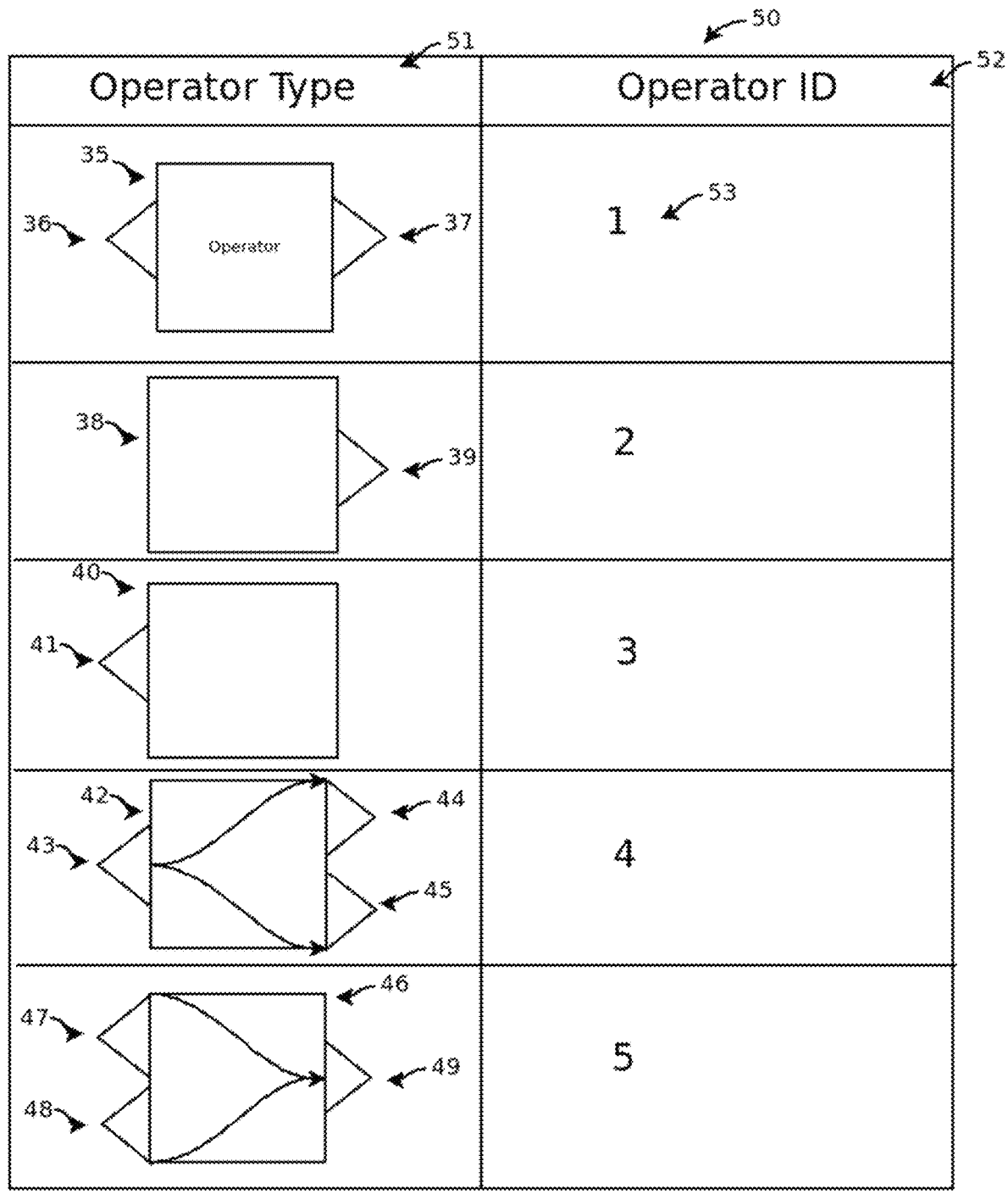
FIG. 4 shows the categories of graphical operator elements according to the teachings of the present invention.

FIG. 4 shows the categories of graphical operator elements. Functionality icon 4 of interface system 3 can be divided into several icon types with specific functions that are independent of the particularity of the operations they are required to perform. FIG. 4 shows an operator 35 that has an input link connector 36 and an output link connector 37. The operator 35 represents an operation that has one input and one output. For example, this may represent a single instruction single datum (SISD) or single instruction multiple data operation (SIMD). An operator 38 contains an output link connector 39 representing a source operation. A source operation can be usually be taken but not limited to data extraction from a source that can be a database, file, web service, or other similar operation that does not accept an input to the operator. An operator 40 contains an input link connector 41 representing a destination operation. A destination operation can be usually be taken but not limited to data storage such as insertion to a database, file, web service or other operation that only accepts an input to the operator. An operator 42 represents a split operation. The operator 42 has an input link connector 43 that represents the input to the system. The operator 42 also contains an output link connector 44 and an output link connector 45. The split operation done by operator 42 takes one input through input link connector 43 and performs a split of the data into separate streams that are redirected to output link connector 44 and output link connector 45. Finally, an operator 46 represents a join operation. The operator 46 has an input link connector 47 and an input link connector 48. The operator 46 also contains an output link connector 49. The join operation carried out by operator 46 takes two data streams through input link connector 47 and input link connector 48 and joining the data stream into a single output that is sent to output link connector 49. The type of joining of data of operator 42 and splitting of data by operator 46 is independent of the operator type. A database table 50 can store the categories represented in operators 35, 38, 40, 42, 46 in a column 51 and have an operator ID column 52 storing an ID 53 that will be used to identify particular implementations of operators 35, 38, 40, 42, 46.

FIG. 5 shows a database table of an exemplary implementation of operator types alongside identifying fields. A database table 54 holds an operator field 55 that holds an operator 56. The operator 56 is given its diagrammatic form via functionality icon 4. The operator 56 is described by an operation field 57 that provides a description of what the operator does. The operator 56 is associated via database table 64 to operator ID column 52 of database table 50 via an operation ID field 58 thereby linking a particular operator with its type.

Figure 6:
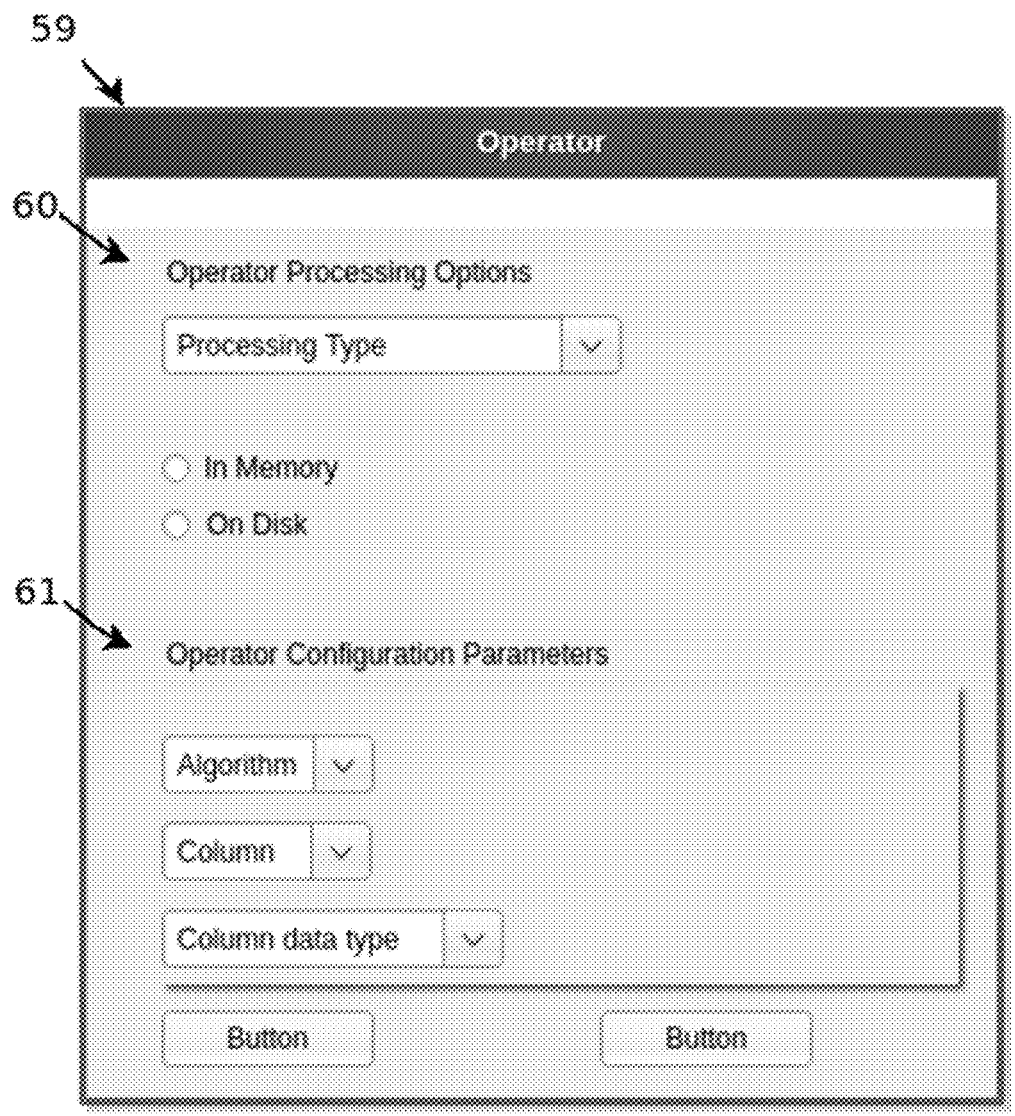
FIG. 6 shows an example of general fields that make up the configuration parameters of an operator according to the teachings of the present invention.

FIG. 6 shows an example of general fields that make up the configuration parameters of an operator. The operator 56 accessed on interface system 3 via functionality icon 4 which will then present a configuration window 59. The configuration window can have multiple configuration parameters. Such parameters can be divided into an operator processing options 60 and operator configuration parameters 61. Operator processing options 60 depend on the particular hardware options of terminal 1, the central processing system 2 and distributed architecture 5. Operator processing options 60 depend on the type of process or algorithm implemented and the data characteristics on which the operator will act upon.

Figure 7:
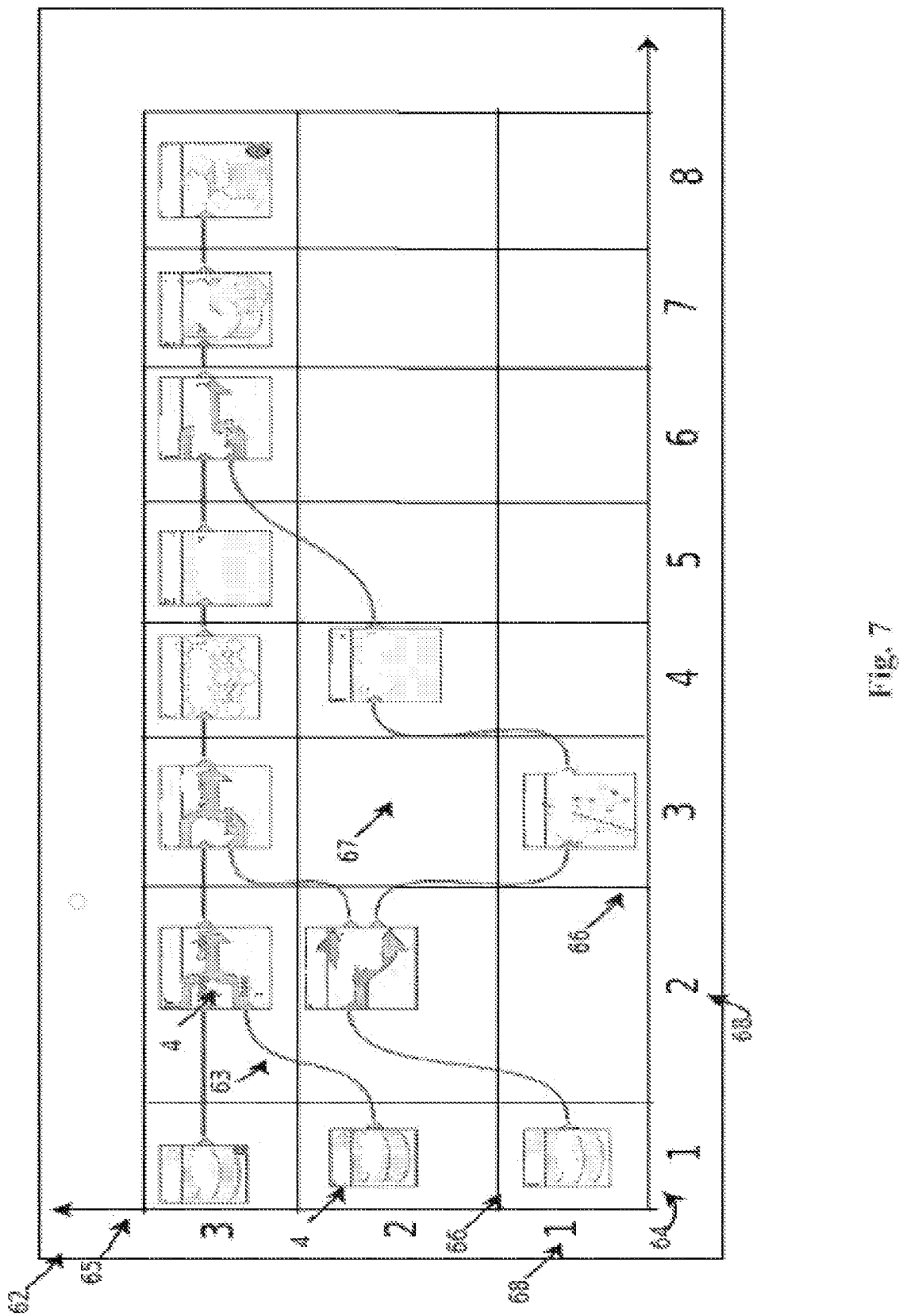
FIG. 7 Shows an execution map representative of a machine learning workflow divided into a grid where operators can be identified within a particular workflow according to the teachings of the present invention.

FIG. 7 shows an execution map representative of a machine learning workflow divided into a grid where operators can be identified within a particular workflow. A machine learning workflow 62 is representative of a typical machine learning flow. The flow is composed of functionality icons 4 which are joined by a workflow line 63. The machine learning workflow 62 can be put into a context of a grid by adding an x-grid line 64 and an y-grid line 65. The x-grid line 64 and the y-grid line 65 can each be divided by a line segments 66 that make up a square segment 67. Each segment 67 can then be identified by a number 68 on the x-grid line 64 and an y-grid line 65. The square segment 67 can be empty or populated by functionality icons 4. The functionality icon that is mapped to an operator 56 can give each square segment 67 a maximum number of line segments 66 depending on the description on database table 50 of operator 56. This particular implementation makes validation of the flow deterministic in nature.

Figure 8:
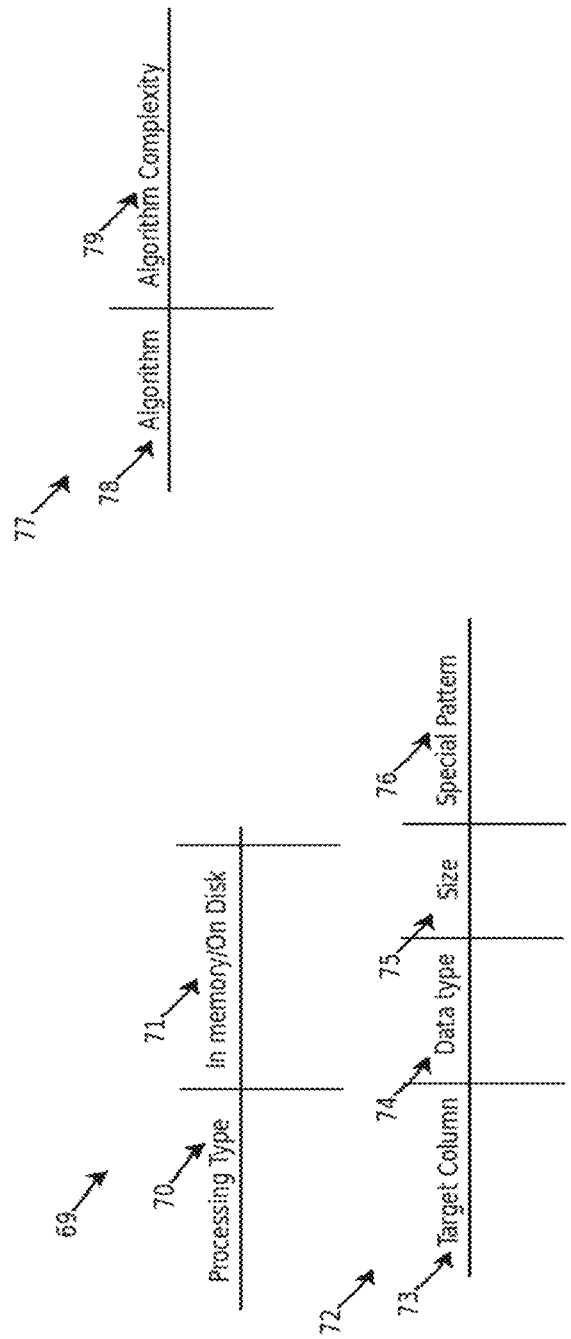
FIG. 8 shows a table representation of descriptive fields of the operators according to the teachings of the present invention.

FIG. 8 shows a table representation of descriptive fields of the operators. A database table 69 shows properties of the operator 56 configuration that is done in configuration window 59 of FIG. 6. Database table 69 contains fields that belong to the particular hardware configuration parameters of the operator 56 such as a processing type field 70 that indicates whether it is single processor, multi core execution, GPU, etc., and a field 71 for in memory/on disk execution type. A database table 72 contains data parameters on which the operator 56 will execute on. A database table 72 contains attributes that belong to the data on which the operator 56 has been implemented on. The table 72 contains a column 73 which contains the target column of a file that has a vector format where each column belongs to a vector component. Table 72 also contains a column 74 that specifies the data type of the target data column identified in column 73. Column 73 can be represented as the column name, its position on the file, its identification number or a combination of fields or a composite of fields. Table 72 also contains a column 75 for the size of the data field. The size of the field can be interpreted as the number of characters of a string or the precision of a double precision number. The table 72 also contains a column 76 that holds particular patterns of the data such as those encoded by a regular expression or other such specification. A database table 77 contains information pertaining to the algorithm used in operator 56. The database table 77 contains information encoded in columns such as a table column 78 for the particular algorithm and a database table column 79 that specified the algorithm complexity of the particular algorithm implemented. This fields are not to be construed as the only fields to be included in database tables 69, 72 and 77 but as representative examples of each category of each respective table and the information to be stored in them.

Figure 9:
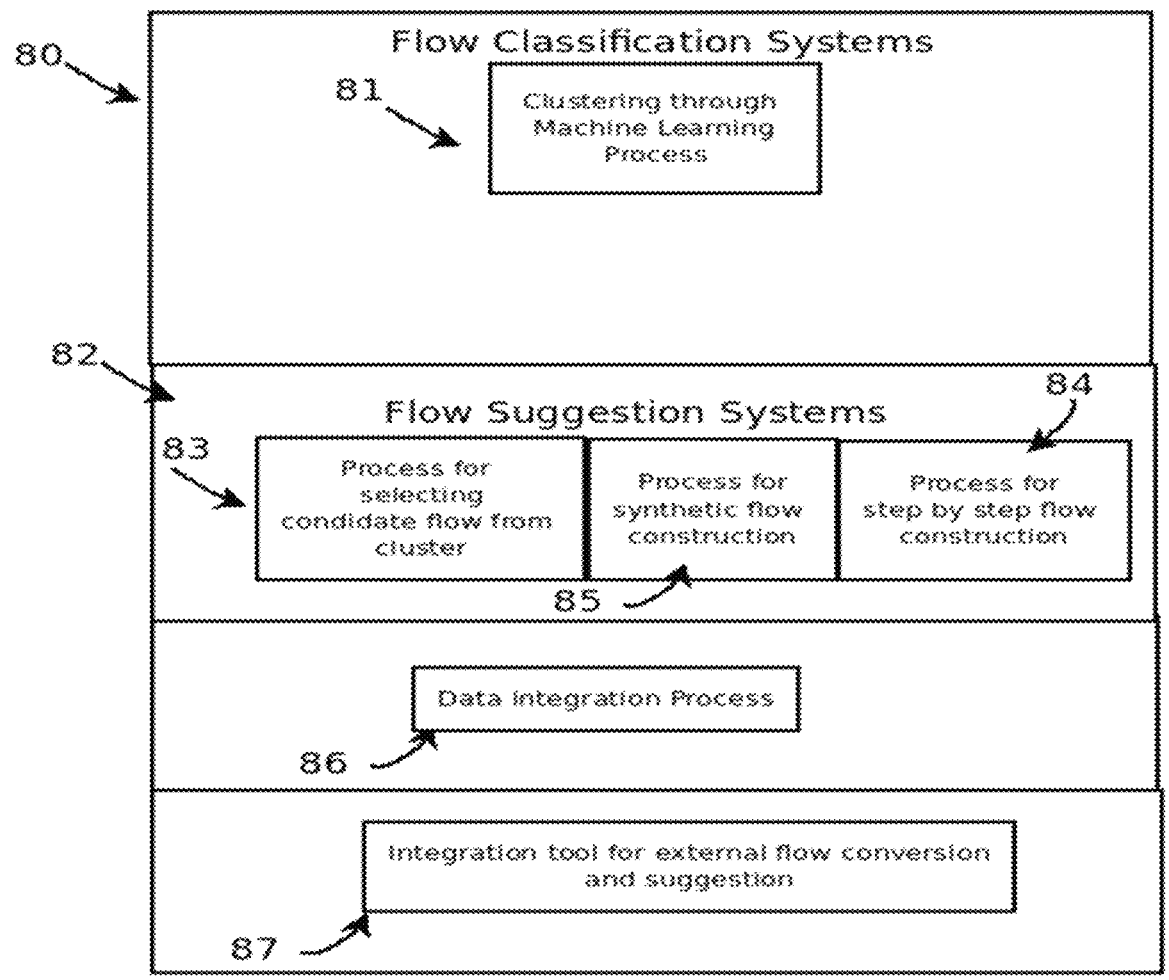
FIG. 9 describes the different components that make up a suggestion system according to the teachings of the present invention.

FIG. 9 describes the different components that make a suggestion system for classifying machine learning flows. A flow classification system 80 contains a subsystem 81 that implements clustering through machine learning processes. The flow classification process 80 also includes a subsystem 82 for machine learning workflow normalization and suggestion. The subsystem 82 of normalization flow suggestion system comprises of a subsystem 83 the enables the process of selecting a candidate flow from the clusters obtained in the classification process 80, a subsystem 84 of step by step construction of the machine learning workflow, and a subsystem 85 that does a synthetic workflow construction. This synthetic workflow does not select a candidate workflow but instead builds it completely based on the information available from the workflows in the cluster. The flow suggestion system also contains a subsystem 86 that can take the selected workflow from subsystem 83, subsystem 84, and subsystem 85 and checks and adjusts its workflow components according to the available data connections. The flow suggestion system further contains subsystem 87 for translation and integration with other similar applications.

Figure 10:
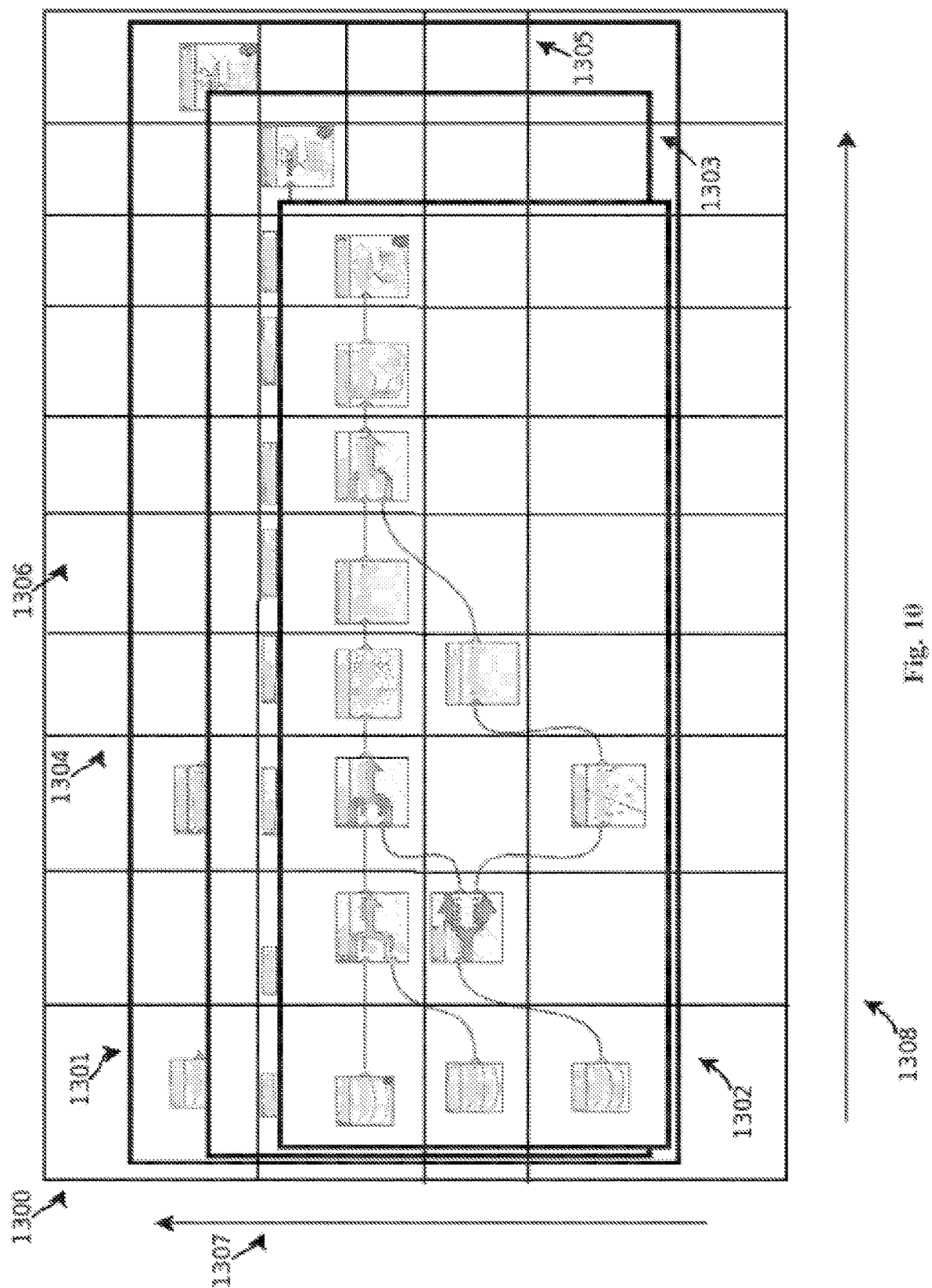
FIG. 10 Shows a flow alignment grid with multiple flows within its structure to determine the overall size of the grid.

FIG. 10 shows a flow alignment grid with multiple flows within its structure to determine the overall size of the grid. An alignment grid 1300 contains a machine learning flow 1301, a machine learning flow 1302 and a machine learning flow 1303. The grid 1300 can contain up to n machine learning flows based on the clusters obtained through subsystem 81 that makes the clusters that are treated as group for the analysis of the alignment grid 1300. The alignment grid consists of vertical lines 1304 and horizontal lines 1305 that serve to make an alignment slot 1306. The size of the alignment grid consists of a y-dimension 1307, a x-dimension 1308, and a z-dimension. The calculation of the y-dimension 1307 will be on the maximum number of branches in any of the flows contemplated. The x-dimension 1308 will be the maximum number of operators in a path from an initiator 1309 to a terminator 1310. The z dimension will consist on the number of non-recurring operators throughout the contemplated group of flows.

Figure 11:
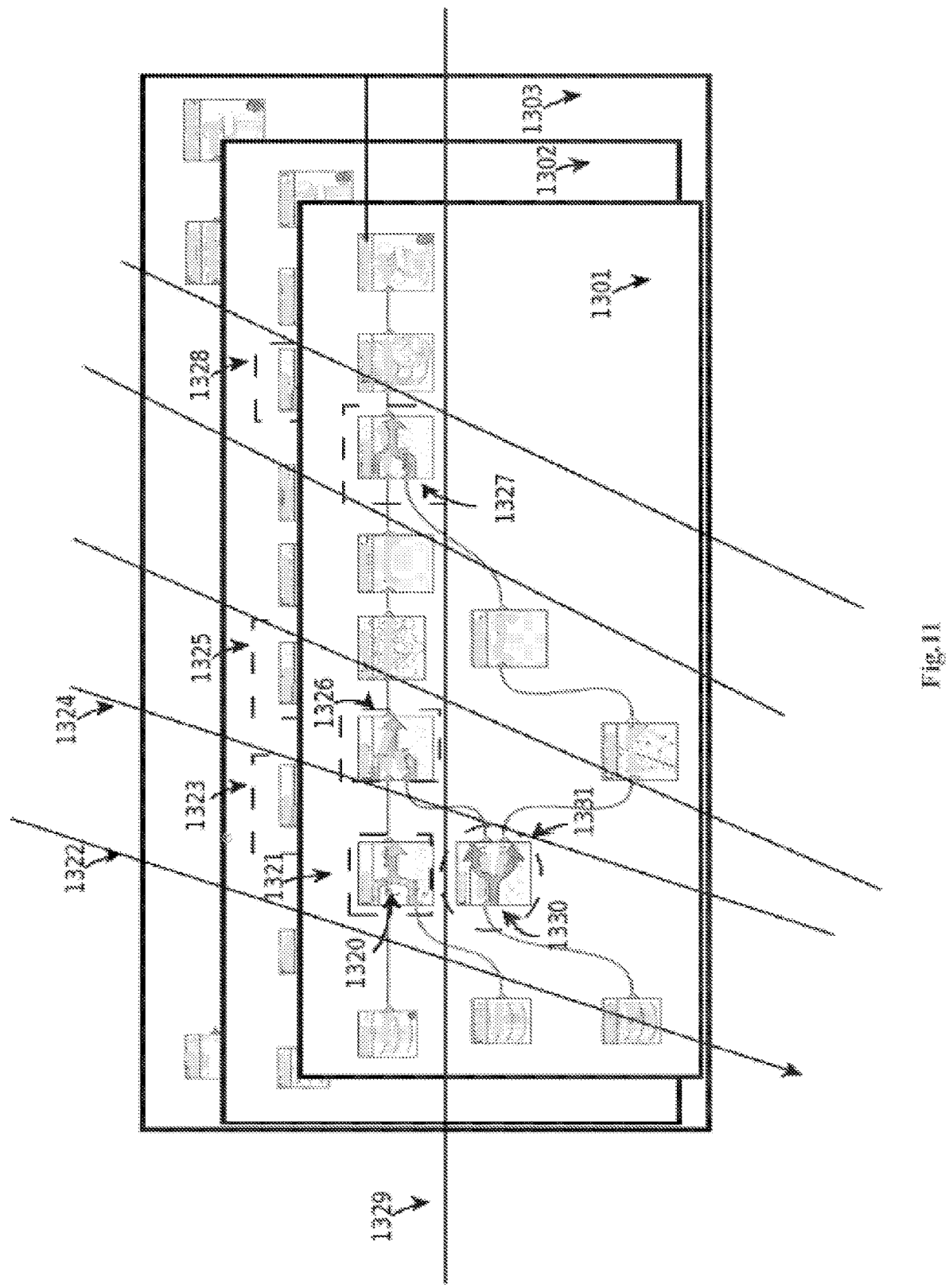
FIG. 11 Shows a flow alignment grid with multiple flows by using join and split operators as constraints for alignment.

FIG. 11 shows a flow alignment grid with multiple flows by using join and split operators as constraints for alignment. An operator 1320 is highlighted as a join operator by a dashed square 1321. The highlighting by dashed square 1321 is made to identify a restriction made by a join operation on the alignment grid 1300. The restriction is made by a line 1322 on the x-dimension 1308 where it separates a segment into two alternative paths. This restriction is searched for in machine learning flow 1302 and machine learning flow 1303. The restriction helps aligning multiple flows into coherent bundles of paths for analysis. An operator 1323 from machine learning flow 1302 is shown meeting the same restriction as machine learning flow 1301. The restriction found on both machine learning flow 1301 and machine learning flow 1302 out of three flows shows that it is more likely that the restriction is likelier than no restriction (e.g. there is a higher likelihood of being correct if there is a path splitting on the ideal flow to be constructed by the process). A second line 1324 of alignment grid 1300 is shown serving the same function as line 1322 but on the right-hand side of both operator 1320 and operator 1323. The process is similar for the pair of operators composed of an operator 1325, an operator 1326, and an operator 1327 with an operator 1328. A horizontal line 1329 separates operator 1320 with an operator 1330 identified by a dashed circle 1331 that identifies the operator as a split operator restriction. The two restrictions of join operators as well as split operators help identify the number of independent paths that the flow has across the group of flows.

Figure 12:
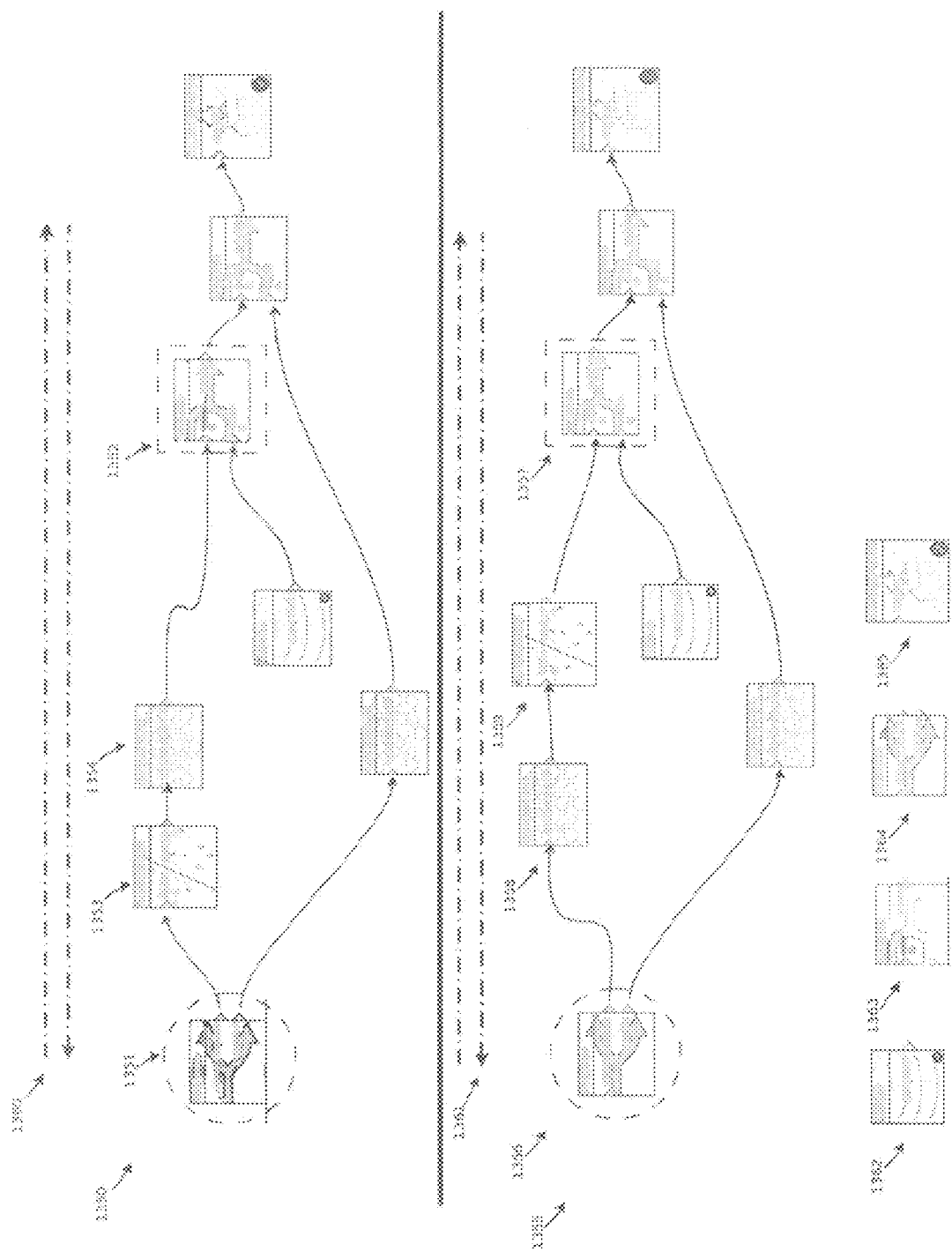
FIG. 12 Shows two flows where there is a transposition of operators on one flow with respect to the other.

FIG. 12 shows two flows where there is a transposition of operators on one flow with respect to the other. A flow 1350 has a split operator 1351 and a join operator 1352. Between the split operator 1351 and the join operator 1352 lies an operator 1353 and an operator 1354. A second flow 1355 has a split operator 1356 in the same position as split operator 1351, a join operator 1357 in the same position as the join operator 1352 and have been placed as restrictions on the alignment grid 1300. An operator 1358 of second flow 1355 corresponds to operator 1354 of flow 1350 and an operator 1359 corresponds to operator 1353 of flow 1350. Operator 1358 and operator 1359 of second flow 1355 are transposed with respect to operators 1353 and operator 1354 of flow 1350. A scan 1360 and a scan 1361 represent the process of scanning through paths to detect transpositions. The scanning to detect transpositions are delimited by an operator 1362 that has only an output and serves as input to flows, or an operator 1363 that does a join operation, or an operator 1364 that does a split operation or an operator 1365 that serves to terminate the flow and does storage operations. The described operation is not just limited to individual operators but to sets of operators defined by the boundaries established between the split operator 1351 and the join operator 1352.

Figure 13:
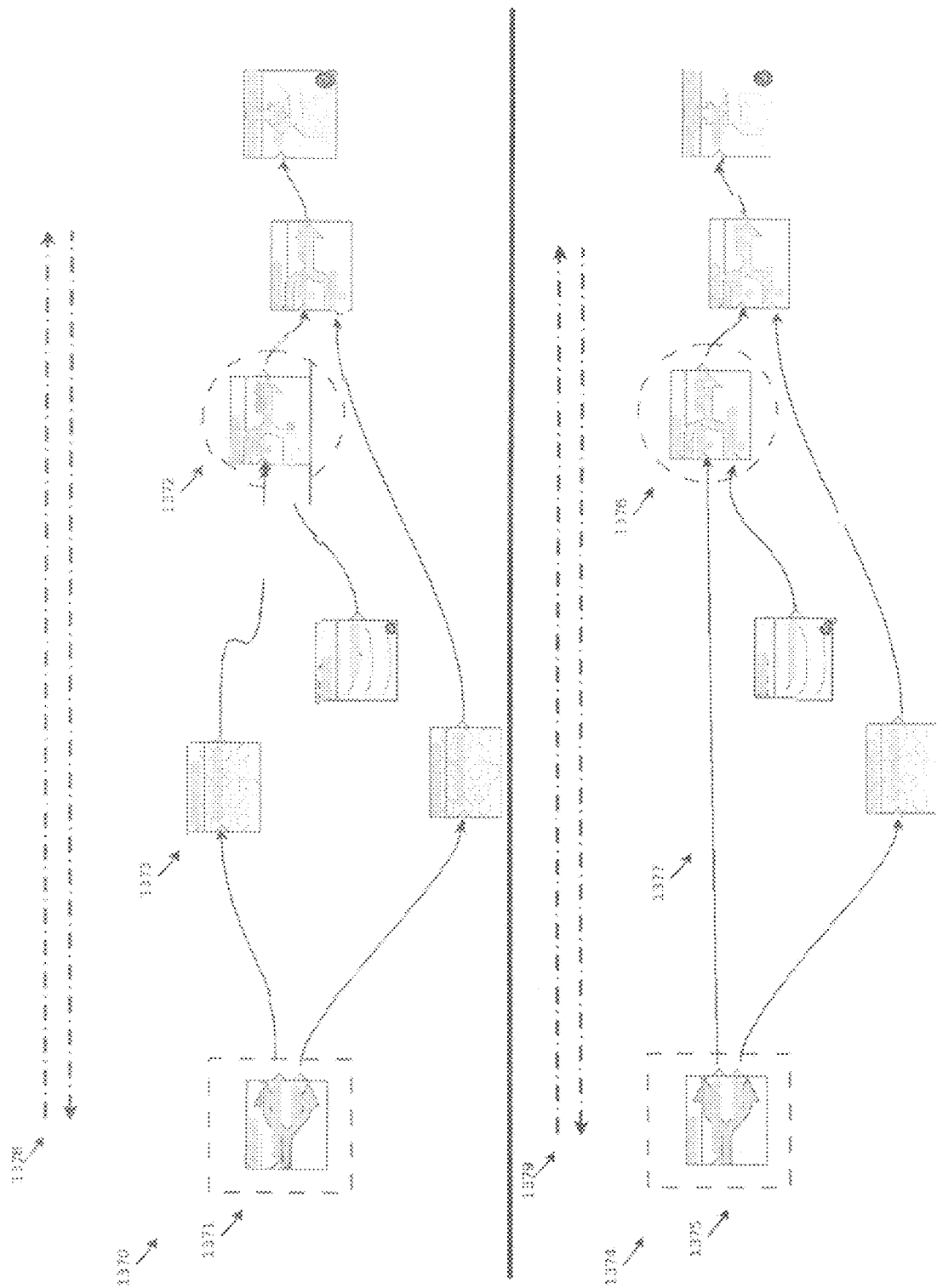
FIG. 13 Shows two flows where there is a deletion of and operator on one of the flows with respect to the other.

FIG. 13 shows two flows where there is a deletion of an operator on one of the flows with respect to the other. A flow 1370 has a split operator 1371 and a join operator 1372. Between the split operator 1371 and the join operator 1372 lies an operator 1373. A second flow 1374 has a split operator 1375 in the same position as split operator 1371, a join operator 1376 in the same position as the join operator 1372 and have been placed as restrictions on the alignment grid 1300. A line connector 1377 connects split operator 1375 with join operator 1376 without any operator in between them as in flow 1370. This represents a deletion of operator 1373 of flow 1370 with respect to second flow 1374. A scan 1378 and a scan 1379 represent the process of scanning through paths to detect deletions. The scanning to detect deletions are delimited by operator 1362 that has only an output and serves as input to flows, or operator 1363 that does a join operation, or operator 1364 that does a split operation or operator 1365 that serves to terminate the flow and does storage operations.

Figure 14:
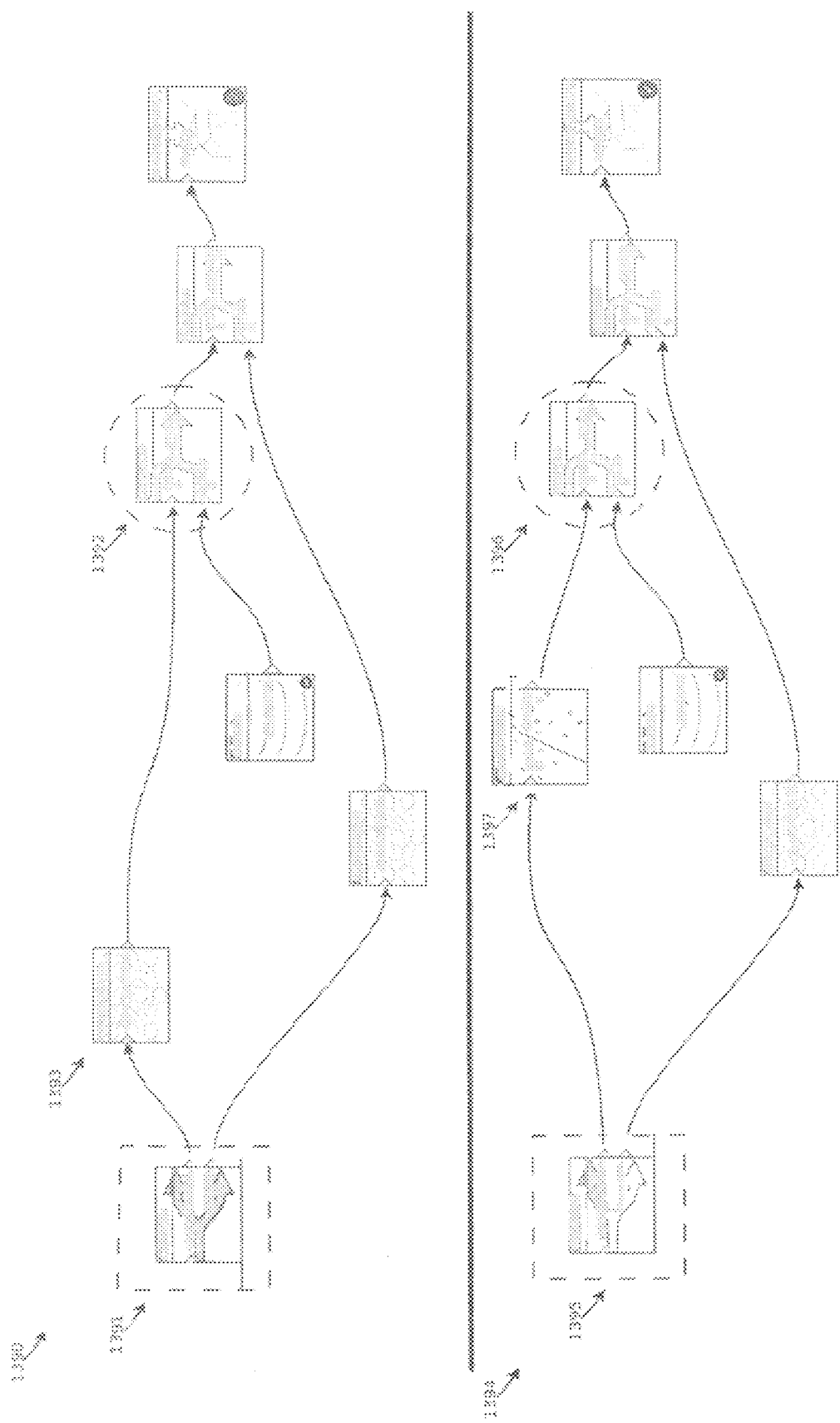
FIG. 14 Shows two flows where there are different operators on one path of the flows with respect to the equivalent path of a second flow.

FIG. 14 shows two flows where there are different operators on one path of the flows with respect to the equivalent path of a second flow. A flow 1390 has a split operator 1391 and a join operator 1392. Between the split operator 1391 and the join operator 1392 lies an operator 1393. A second flow 1394 has a split operator 1395 in the same position as split operator 1391, a join operator 1396 in the same position as the join operator 1392 but an operator 1397 that is not the same as operator 1393 of flow 1390.

Figure 15:
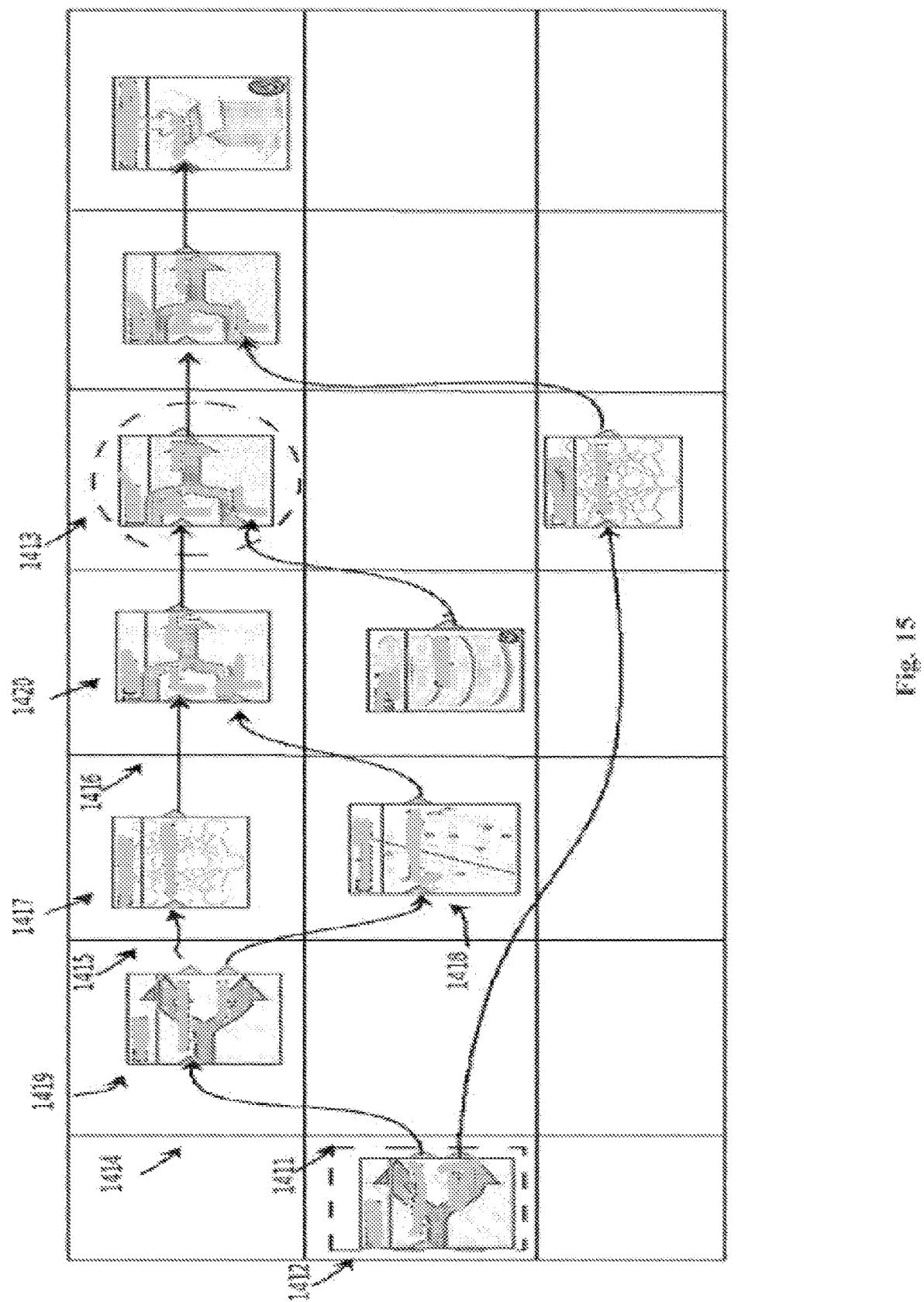
FIG. 15 displays the operation of alignment that takes place between flows that contain different operators in an equivalent path among flows and both operators are above a frequency threshold.

FIG. 15 displays the operation of alignment that takes place between flows that contain different operators in an equivalent path among flows and both operators are above a frequency threshold. A flow 1411 is the union of flow 1390 and second flow 1394. The split operator 1391 and split operator 1395 are merged into a split operator 1412. A join operator 1413 represents both join operator 1392 and join operator 1396. The process uses split operator 1412 and join operator 1413 as alignment to place a grid line 1414, a grid line 1415, and a grid line 1416 as part of the alignment grid 1300. The process calculates the frequency of operator 1393 and operator 1397 and determines they are above a threshold for inclusion and are added to the flow as an operator 1417 and an operator 1418. If they are not above the threshold then the process rolls back the addition of the join and split operator and the added lines to the flow. This operation is what generates the grid line 1414, grid line 1415, and grid line 1416 as part of the alignment grid 1300. The addition of both operator 1417 and operator 1418 to the union of both flow 1390 and second flow 1394 makes the flow incomplete and a new split operator 1419 is added to the new flow and a new join operator 1420 is also added. In an alternate process outcome where one of the operators 1393 or operator 1397 fall below the frequency threshold, then the process would only need to select the operator above the frequency threshold to add to the merged flow and simplify the flow without any further additions of grid line 1414, grid line 1415, grid line 1416, new split operator 1419, and new join operator 1420.

Figure 16:
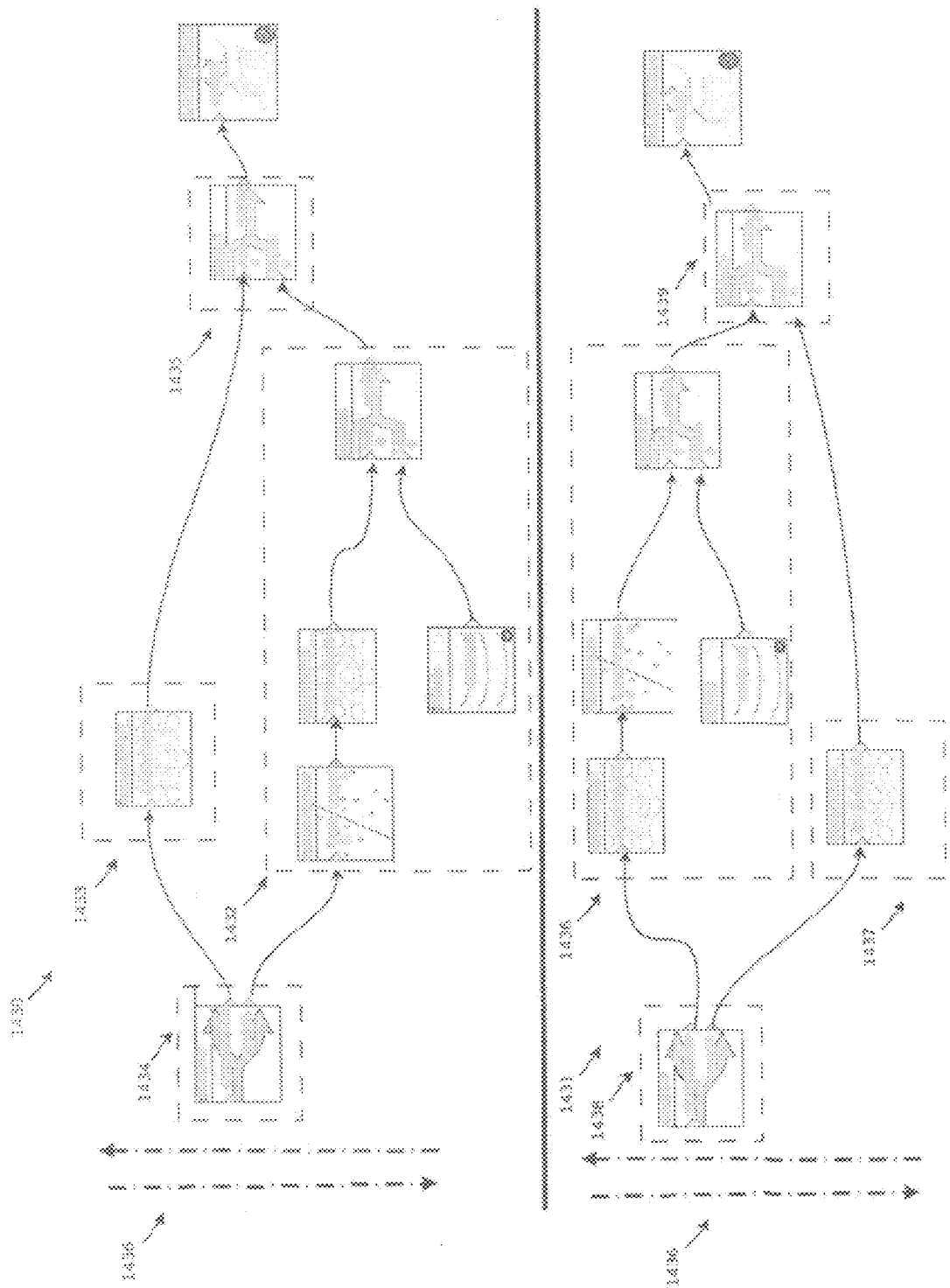
FIG. 16 Shows two flows where there are two branches of a flow that are inverted with respect to the equivalent path of a second flow.

FIG. 16 shows two flows where there are two branches of a flow that are inverted with respect to the equivalent path of a second flow. A flow 1430 is compared to a second flow 1431. Flow 1430 has a block of operators 1432 and a second block of operators 1433 on alternate paths of a branching process that is delimited by a split operator 1434 and a join operator 1435. The same structure appears in the second flow 1431 but in inverted order where a block of operators 1436 corresponds to block of operators 1432 and a block of operators 1437 corresponds to block of operators 1433 delimited by a split operator 1438 and a join operator 1439.

Figure 17:
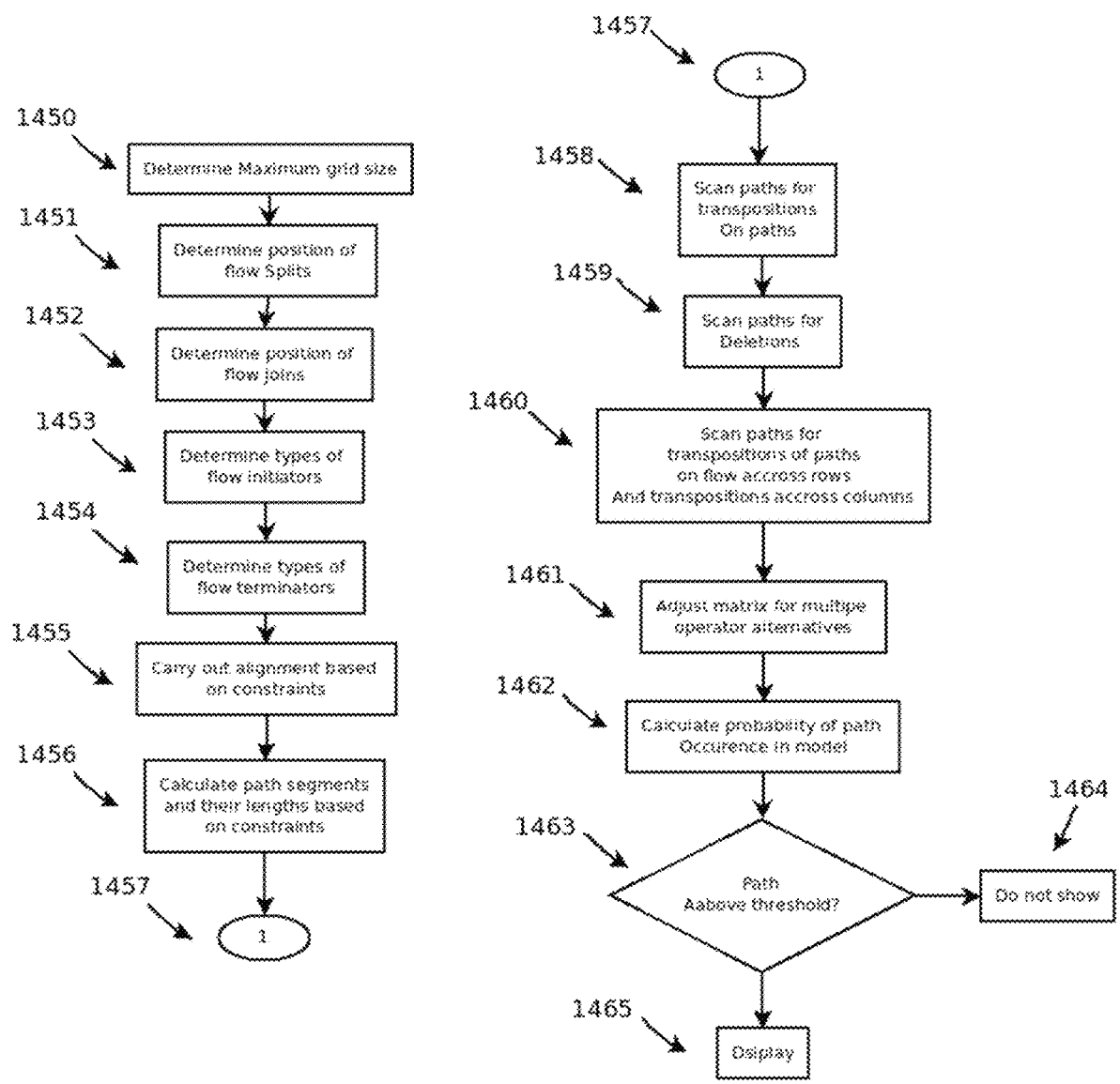
FIG. 17 Shows the process steps for preparing the analysis of the flows to construct the composite flow for display.

FIG. 17 shows the process steps for preparing the analysis of the flows to construct the composite flow for display. The process starts with the determination of the maximum grid size based on the available flows for analysis. The step 1450 is followed by a step 1451 where the position of the split flows is determined to establish common branching processes among the different flows being analyzed. The step 1451 has a complimentary step which is a step 1452 that determines the position of the joins within the flows and matches them with the split operators. A step 1453 determines the flows initiators while a step 1454 determines the flows terminators. Once step 1451, step 1452, step 1453, and step 1454 are carried out, a step 1455 carries out an alignment process based on matching initiators, terminators, split and join pairs among the flows under analysis. Once the alignment is carried out, a recalculation of the maximum size of the grid is carried out. A step 1456 follows step 1455 which calculates the path length for each of the paths. The same path may have different lengths and each of these lengths is assigned a probability based on the frequency of occurrence within the flows analyzed.

A continuation of the flow is given by a continuation 1457 and into a step 1458 where each path and its variants is scanned for transpositions and if found the alternate redundant path is eliminated and the probability of occurrence is recalculated based on the cumulative frequency of occurrence of the path and its transposition. A step 1459 scans the path for deletions of operators for each path and calculate the frequency of occurrence and assign a probability based on this frequency of occurrence. Step 1459 will also compute the complement of the deletion to establish which probability is highest and adjusts the composite flow accordingly by inserting the operator or leaving it as a deletion. A step 1460 scans each path for transpositions of paths across the rows of the flow and if the transpositions are found the frequency of occurrence is adjusted to reflect the duplication and merged as a single entry. A step 1461 adjusts the matrix to include multiple operator alternatives and the inclusion of new split operator 1419 and new join operator 1420 if it is determined that the alternatives lie above a threshold and not treated as deletions and are deleted in step 1459. Once step 1459 is completed a step 1462 calculates the final probability of occurrence of each path and its variants along with the component operators for each path. A step 1463 then determines if the path or any of its variants is to be included in the final rendering of the model. If it is not within the threshold, the process goes to a step 1464 where that particular flow variant, flow or operator is not displayed else it goes to a step 1465 where it is displayed. Step 1463 step 1464 and step 1465 have additional parameters for the decision and adjustments on the grid. If multiple alternatives are above the threshold for a single path, then the variant with the highest probability of occurrence is selected. If a path does not meet the threshold criteria and falls within a split and join operators, then the split and join operators are eliminated and the complementary path is the only one displayed and the grid is adjusted to reflect these changes.

Figure 18:
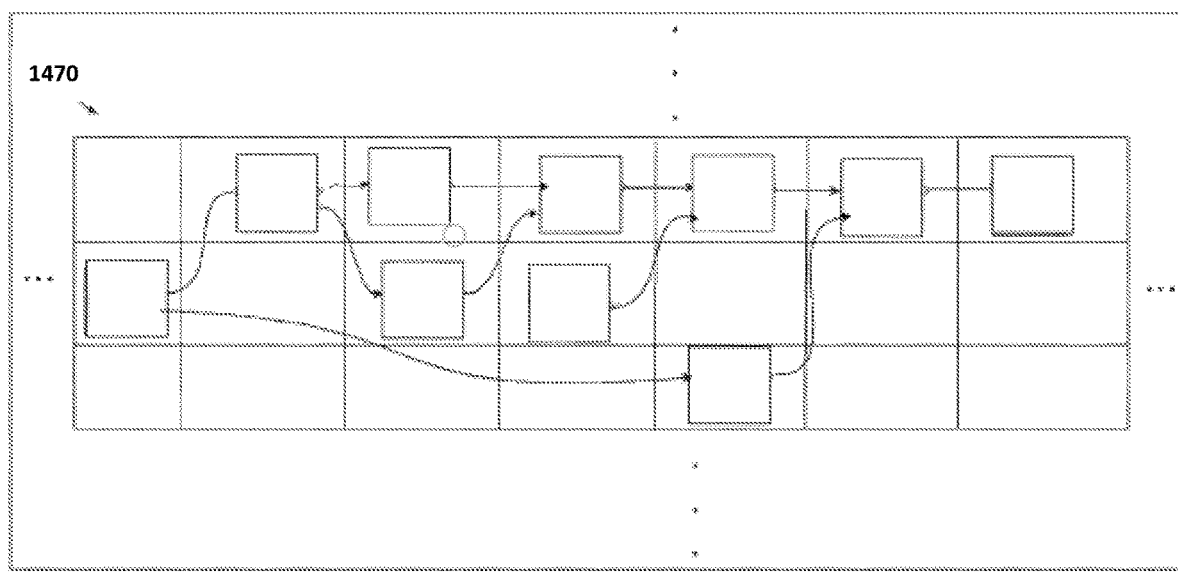
FIG. 18 displays the final flow with the assignment of probabilities to each of the operators of the flow.

FIG. 18 displays the final flow with the assignment of probabilities to each of the operators of the flow. A flow 1470 is the result of the steps carried out from step 1450 to step 1465.

Figure 19:
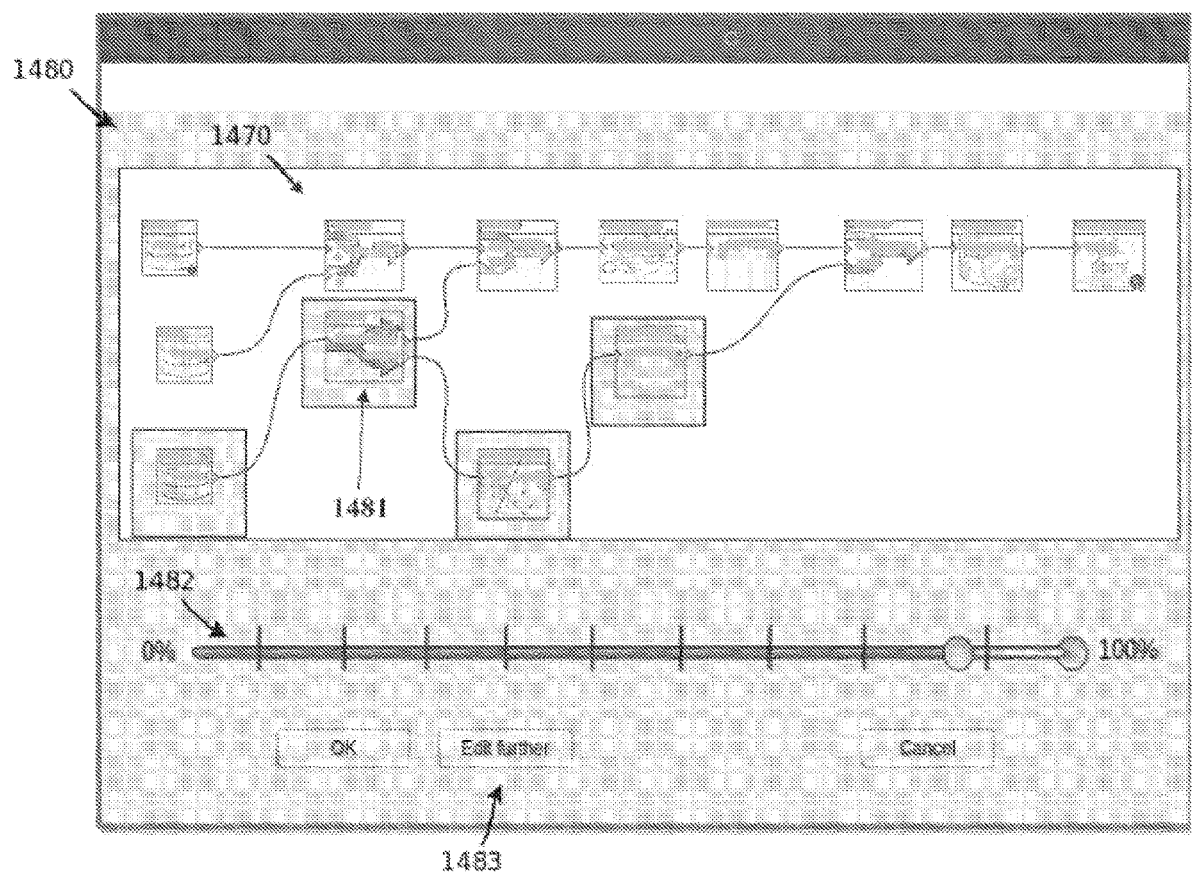
FIG. 19 displays the user interface that displays the final composite flow extracted from the group of flows under analysis.

FIG. 19 displays the user interface that displays the final composite flow extracted from the group of flows under analysis. An interface 1480 displays the graph 1470 that presents the group of flows path variant that meet the threshold criteria and has the highest probability of occurrence. A user can select a block 1481 and use a scroll bar 1482 to select a variant based on a different probability of occurrence. Block 1481 can cover individual operators and multiple paths depending on the block dimensions. Alternatively, buttons can specify whether operators or flows are chosen, and various polygon shapes can be used to bound the area of interest. A button 1483 allows the flow to be edited manually should the user desire.

What is claimed:

1. A computer-implemented method for constructing an alignment grid and displaying a computer executed machine learning composite workflow through machine learning suggestions on the alignment grid, wherein said computer executed machine learning composite workflow comprises an interface system that has a plurality of icons representing operators with hardware configuration parameters, said method comprising the steps of:

generating an alignment grid comprising:

a plurality of vertical lines and horizontal lines on said alignment grid that mark an alignment slot;

determining an x-dimension of said vertical lines based on a maximum number of operators in a path from a flow initiator operator to a flow terminator operator in a plurality of computer executed machine learning composite workflows;

determining positions for split and join operators in said plurality of computer executed machine learning composite workflows to mark a number of independent paths that each of the computer executed machine learning composite workflows have across said plurality of computer executed machine learning composite workflows;

determining a y-dimension of said horizontal lines based on a maximum number of said independent paths in said plurality of computer executed machine learning composite workflows;

determining a z-dimension of said horizontal lines based on the number of non-recurring operators in said plurality of computer executed machine learning composite workflows;

determining a position of a split operator as a restriction made by a line on said x-dimension on said alignment grid to identify the number of independent paths;

determining the position of the join operator as a restriction made by a line on said x-dimension on said alignment grid to identify the number of independent paths;

determining positions for flow initiator operators in said plurality of computer executed machine learning composite workflows;

determining positions for flow terminator operators in said plurality of computer executed machine learning composite workflows;

carrying out the repositioning of said vertical lines on the x-dimension by using said restrictions of said split and join, flow initiator and flow terminator operators to match machine learning flows meeting the same restrictions on said plurality of computer executed machine learning composite workflows based on said alignment grid;

carrying out the resizing of said alignment grid by using said restrictions of said split and join, flow initiator and flow terminator operators to match machine learning flows meeting the same restrictions on said plurality of computer executed machine learning composite workflows;

determining a path length for each path in said plurality of computer executed machine learning composite workflows;

establishing a threshold criteria representing a minimum number of times of occurrences for each path using path lengths for all paths in said plurality of computer executed machine learning composite workflows;

assigning a probability using said minimum number of times of occurrences on said path lengths in said plurality of computer executed machine learning composite workflows;

determining transpositions between rows and columns in paths by scanning a scanning delimited by a restriction split and join, an operator that has one output and an operator that has one input on said plurality of computer executed machine learning composite workflows;

modifying, by eliminating redundant paths in said alignment grid based on said transpositions between rows and columns;

recalculating said probability for each of said path lengths using said minimum number of times of occurrences on said path lengths in said plurality of computer executed machine learning composite workflows;

determining deletions between paths by scanning delimited by a restriction split and join, an operator that has one output and an operator that has one input on said plurality of computer executed machine learning composite workflows;

adjust the computer executed machine learning composite flow accordingly by inserting said determined deletion or leaving the computer executed machine learning composite workflow with the deletion;

recalculating said probability for each of said path lengths using said minimum number of times of occurrences on said path lengths in said plurality of computer executed machine learning composite workflows;

adjusting said alignment grid such that only paths that contain a probability above said threshold criteria are included; and sorting and displaying the final computer executed machine learning composite workflow extracted from the group of computer executed machine learning composite workflows so as to present the group of computer executed machine learning composite workflow paths that meets said threshold criteria and has the highest number of occurrences first.

2. The method as in claim 1, wherein said transpositions between rows and columns in a path are based on individual operators inside said alignment grid.

3. The method as in claim 1, wherein said transpositions between rows and columns in a path are based on sets of operators inside said alignment grid.

4. The method as in claim 1, further comprising the step of further adjusting said alignment grid based on additional parameters.

5. The method as in claim 1, further comprising the step of further adjusting said alignment grid to only show the path with a highest probability of occurrence of an individual path in a flow.

6. The method as in claim 1, further comprising the step of displaying said alignment grid and said calculated computer executed machine learning composite workflow path on a user interface.

7. The method as in claim 6, wherein said user interface allows a user to manually modify said alignment grid.

8. A computer-implemented system for constructing an alignment grid and displaying a computer executed machine learning composite workflow through machine learning suggestions on the alignment grid, wherein said computer executed machine learning composite workflow comprises an interface system that has a plurality of icons representing operators with hardware configuration parameters, said system comprising:
  one or more computer processors;
  one or more non-transitory computer readable memories;
  program instructions stored on said one or more non-transitory computer readable memories for execution by at least one of said one or more computer processors, said program instructions comprising:
  generating an alignment grid comprising:
  a plurality of vertical lines and horizontal lines on said alignment grid that mark an alignment slot;
  determining an x-dimension of said vertical lines based on a maximum number of operators in a path from a flow initiator operator to a flow terminator operator in a plurality of computer executed machine learning composite workflows;
  determining positions for split and join operators in said plurality of computer executed machine learning composite workflows to mark a number of independent paths that each of the computer executed machine learning composite workflows have across said plurality of computer executed machine learning composite workflows;
  determining a y-dimension of said horizontal lines based on a maximum number of said independent paths in said plurality of computer executed machine learning composite workflows;
  determining a z-dimension of said horizontal lines based on the number of non-recurring operators in said plurality of computer executed machine learning composite workflows;
  determining the position of the split operator as a restriction made by a line on said x-dimension on said alignment grid to identify the number of independent paths;
  determining the position of the join operator as a restriction made by a line on said x-dimension on said alignment grid to identify the number of independent paths;
  determining positions for flow initiator operators in said plurality of computer executed machine learning composite workflows;
  determining positions for flow terminator operators in said plurality of computer executed machine learning composite workflows;
  carrying out the repositioning of said vertical lines on the x-dimension by using said restrictions of said split and join, flow initiator and flow terminator operators to match machine learning flows meeting the same restrictions on said plurality of computer executed machine learning composite workflows based on said alignment grid;
  carrying out the resizing of said alignment grid by using said restrictions of the said split and join, flow initiator and flow terminator operators to match machine learning flows meeting the same restrictions on said plurality of computer executed machine learning composite workflows;
  determining a path length for each path in said plurality of computer executed machine learning composite workflows;
  establishing a threshold criteria representing a minimum number of times of occurrences for each path using path lengths for all paths in said plurality of computer executed machine learning composite workflows;
  assigning a probability using said number of minimum times of occurrences on said path lengths in said plurality of computer executed machine learning composite workflows;
  determining transpositions between rows and columns in paths by scanning a scanning delimited by a restriction split and join, an operator that has one output and an operator that has one input on said plurality of computer executed machine learning composite workflows;
  modifying, by eliminating redundant paths in said alignment grid based on said transpositions between rows and columns;
  recalculating said probability for each of said path lengths using said minimum number of times of occurrences on said path lengths in said plurality of computer executed machine learning composite workflows;
  determining deletions between paths by scanning delimited by a restriction split and join, an operator that has one output and an operator that has one input on said plurality of computer executed machine learning composite workflows;
  adjust the computer executed machine learning composite flow accordingly by inserting said determined deletion or leaving the computer executed machine learning composite workflow with the deletion;
  recalculating said probability for each of said path lengths using said minimum number of times of occurrences on said path lengths in said plurality of computer executed machine learning composite workflows;
  adjusting said alignment grid such that only paths that contain a probability above said threshold criteria are included; and
  sorting and displaying the final computer executed machine learning composite workflow extracted from the group of computer executed machine learning composite workflows so as to present the group of computer executed machine learning composite workflow paths that meets said threshold criteria and has the highest number of occurrences first.

9. The system of claim 8, wherein said transpositions between rows and columns in a path are based on individual operators inside said alignment grid.

10. The system of claim 8, wherein said transpositions between rows and columns in a path are based on sets of operators inside said alignment grid.

11. The system of claim 8, further comprising the step of further adjusting said alignment grid based on additional parameters.

12. The system of claim 8, further comprising the step of further adjusting said alignment grid to only show the path with a highest probability of occurrence of an individual path in a flow.

13. The system of claim 8, further comprising the step of displaying said alignment grid and said calculated computer executed machine learning composite workflow path on a user interface.

14. The system of claim 13, wherein said user interface allows a user to manually modify said alignment grid.

* * * * *